Nov. 3, 1959   J. C. DANLY   2,910,933
POWER PRESS TIE ROD HEATING SYSTEM
Filed May 2, 1951
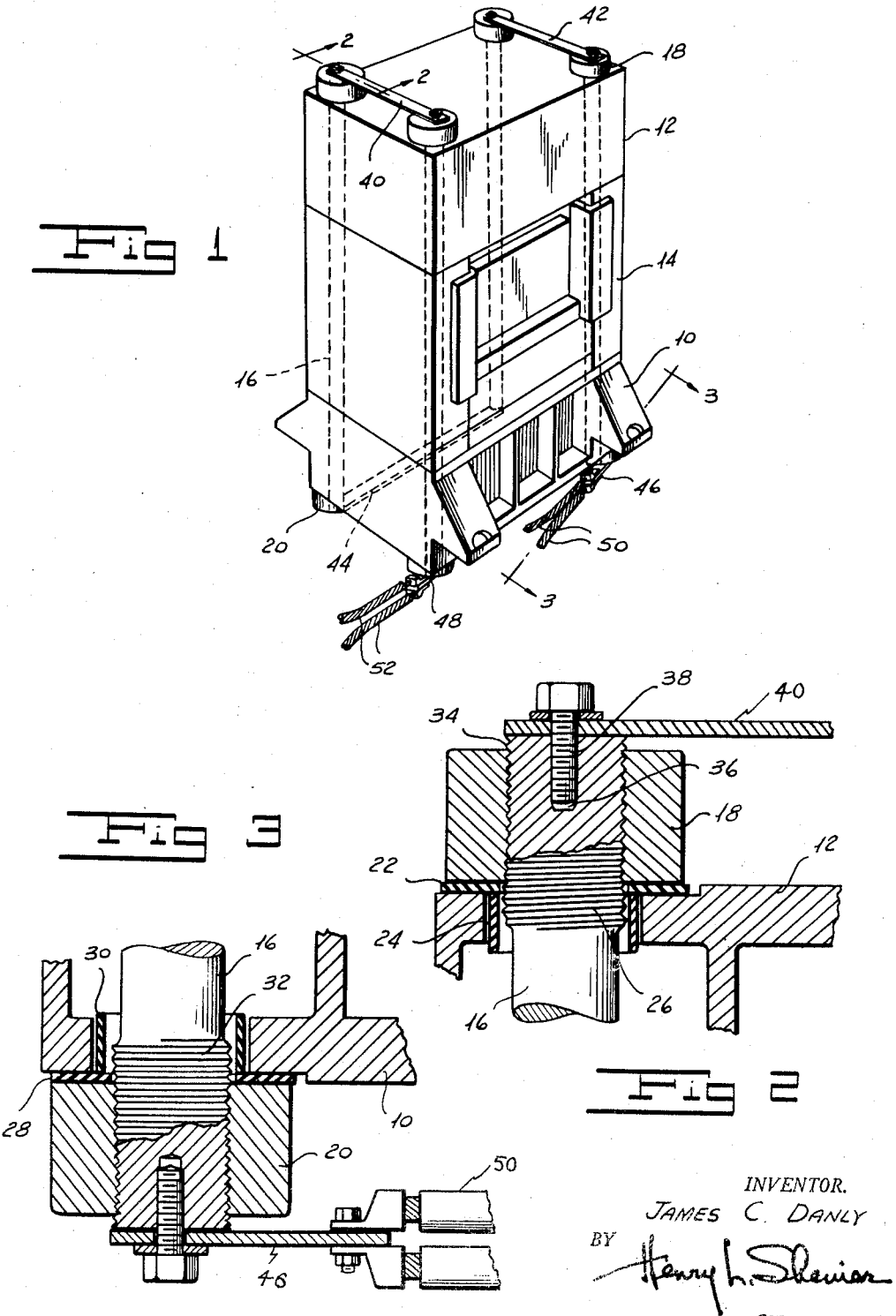
INVENTOR.
JAMES C. DANLY
BY
Henry L. Shevier
ATTORNEY

---

United States Patent Office

2,910,933
Patented Nov. 3, 1959

---

2,910,933

POWER PRESS TIE ROD HEATING SYSTEM

James C. Danly, River Forest, Ill., assignor to Danly Machine Specialties, Inc., Chicago, Ill., a corporation of Illinois Application May 2, 1951, Serial No. 224,228

7 Claims. (Cl. 100—214)

My invention relates to a power press tie rod heating system. In tie rod presses the tie rods are assembled with a tension in the aggregate of twice the capacity of the press. For example, in a 400-ton press using four tie rods, it has been found that good engineering practice requires that the aggregate tension of the tie rods be 800 tons. This means that each tie rod will have a tension of 200 tons. It is impossible to tighten the nuts on a tie rod to achieve this tension. In the prior art this tension is uniformly obtained by heating the tie rods, permitting them to expand, and then tightening the nuts while the tie rods are in lengthened condition due to the expansion following the heating. Then, when the tie rods cool they shrink to give the desired tension. Various methods have been employed in the prior art for heating tie rods, such as the use of acetylene torches and the imbedding of electrical resistance units in the ends of the tie rods. These methods always result in local overheating and it is substantially impossible to heat the tie rod uniformly throughout its length. Furthermore, all the methods of the prior art depend upon heat conduction along the tie rod, and this method requires a comparatively long period of time and produces erratic and nonuniform results. If a press becomes stuck at bottom dead center, as may occasionally happen with a maladjustment of the dies or the inadvertent use of a work metal of a gauge heavier than that for which the dies were designed, it becomes necessary to loosen the tie rods in order to relieve the press. The heating must be undertaken in order to expand the rods sufficiently in order to loosen the nuts. If the press is part of a production line, the economic disadvantage in tying up a press for long periods of time becomes readily apparent.

One object of my invention is to provide a novel system and method for heating tie rods uniformly, rapidly and expeditiously.

Another object of my invention is to provide a method for heating tie rods by passing a heavy alternating current of low voltage through the rods so that the hysteresis and IR drop will heat the tie rods uniformly and rapidly causing them to expand, enabling press frames to be assembled by the shrinking of tie rods or to be disassembled by the expansion of tie rods.

Another object of my invention is to provide a novel construction whereby the tie rods of a press may be rapidly, expeditiously and conveniently expanded by heat occasioned by the passage of a heavy alternating current at low voltage.

Other and further objects of my invention will appear from the following description.

In general, my invention contemplates insulating the tie rods from the frame of the press by means of washers and bushings of solid dielectric material, such as acrylic resins, phenolic resins, furfural resins, polystyrene resins, polytetrafluoroethylene resins and the like, either alone in the form of bushings or washers, or in the form of fabrics impregnated and molded under heat and pressure. The tie rods are connected in series by means of bus bars.

The source of alternating current is connected to the terminals of the circuit through heavy cables to avoid voltage drop between the source of the alternating potential and the tie rods. The nuts are tightened by hand and then current is passed through the tie rods to obtain the temperature required to expand the tie rod the desired amount. This is determined from the coefficient of expansion differential of the steel of the tie rods. The heating time depends upon the weight of the rods, the voltage used and the current flowing. Due to the fact that alternating current is used, the current penetration is limited and we have the additional factors of hysteresis and eddy currents contributing to produce heat. Some loss is incurred due to a secondary effect from induced current in the frame of the press. This merely causes localized heating in the plates of the press surrounding the tie rods. The construction of tie rod presses is such that there is a much greater mass of metal in the press frame than there is in the tie rods and, accordingly, I have found from a number of tests that the temperature rise in the press frame is not sufficient to adversely affect the desired result. The time of heating, therefore, will vary from five minutes in the case of a tie rod having a diameter of 2¼ inches to over twelve hours in the case of a tie rod having a diameter of 12 inches.

In the accompanying drawings which form part of the instant specification and which are to be read in conjunction therewith and in which like reference numerals are used to indicate like parts in the various views:

Figure 1 is a perspective view of a tie rod press fitted with one embodiment of my invention.

Figure 2 is a sectional fragmentary view drawn on an enlarged scale viewed along the line 2—2 of Figure 1.

Figure 3 is a sectional fragmentary view taken along the line 3—3 of Figure 1.

More particularly referring now to the drawings, the press shown in Figure 1 comprises a base portion 10, a crown 12 and intermediate side portion 14 held together by four tie rods 16. The upper portion of each tie rod is provided with a nut 18 and the lower portion of each tie rod is provided with a nut 20. A washer 22 of solid dielectric material is placed between the crown 12 and the nut 18 for each tie rod. A cylindrical bushing 24 may surround the threads 26 adjacent each upper nut 18. Similarly, a washer 28 of solid dielectric material is placed between the base 10 of the press and the nut 20 adjacent each nut. A bushing 30 of solid dielectric material surrounds the threads 32 formed on the lower portion of each tie rod 16. The solid dielectric material may be any suitable synthetic resin, such as acrylic resins, phenolic resins, furfural resins, polystyrene resins, polytetrafluoroethylene resins and the like. If desired, fabric may be impregnated with the solid dielectric material and the washers and bushings molded under heat and pressure. The upper portion 34 of each tie rod is provided with a tapped bore 36 adapted to receive a machine screw 38. A bus bar 40 connects the left-hand tie rods in series adjacent their top portions. A bus bar 42 connects the upper portions of the two right-hand tie rods. A bus bar 44 connects the lower portions of the two rear tie rods. A terminal bus bar 46 is connected to the lower portion of the front right tie rod and a similar terminal bus bar 48 is connected to the lower portion of the front left tie rod. Heavy copper cables 50 are connected to the terminal bus bar 46 and similar heavy copper cables 52 are connected to the terminal bus bar 48.

By way of illustration and not by way of limitation, the tie rods 16 had a diameter of 7½ inches and were used on an 800-ton press. The length of the tie rods was 280 inches. The solid dielectric washers and bushings were made out of formica, which is a laminated phenol condensation product, and were ⅟₁₆ inch thick. The bus bars were ½ inch thick and 5 inches wide. To prevent an excessive voltage drop between the source of alternating current and the terminal bus bars 46 and 48 the cables had an aggregate area of two million circular mils at each terminal. In the test the cables were 42 feet in length and hence required this large conducting area. By shortening the cables I could have used a much lesser area for the cables.

In order to shrink the tie rods for the press, a stress of 20,000 pounds per square inch was used, which was sufficient to keep the frame members of the press from separating when double the rated press tonnage is exerted on the frame. The amount of elongation of the rods was calculated using Young's modulus as follows:

$$\frac{S}{E}=\frac{20{,}000}{30{,}000{,}000}=.000666 \text{ inch/inch}$$

or $$.000666 \times 12 = .008 \text{ inch per foot}$$

Therefore, for the tie rods used in this test, which were 262½ inches long between nuts, Total elongation = 262½ × .000666 = .175 inch.

The nuts were tightened by hand before heating and the gap between the ends of the tie rods and the frame was measured at intervals. When the gap was .175 inch the required elongation had occurred.

The temperature required to expand the tie rod .000666 inch per inch is calculated from the coefficient of thermal expansion for steel which is .00000636 inch per inch per degree Fahrenheit as follows:

$$\frac{.00066666}{.00000636} = 105° \text{ F.}$$

This value of 105° F. is, of course, the average temperature difference required between the portion of the press frame surrounding the tie rods and the tie rods proper.

I used two alternating current welding transformers, each having a rating of 1,000 amperes at 40 volts, connected in parallel to make available 2,000 amperes at 40 volts.

The following data was determined by test:

| Time of Day | Elapsed Time, hrs. | Primary Current A. | Primary Voltage, V. | Secondary Current, A. | Secondary Voltage, V. | Av. Press Temp., degrees | Av. Tie Rod Temp., degrees | Gap |
|---|---|---|---|---|---|---|---|---|
| 11:00 a.m. | Start | 390 | 460 | 2,050 | 43 | 80 | 80 | 0 |
| 1:30 p.m. | 2½ | | | | 44 | 120 | 210 | .148 |
| 2:45 p.m. | 3¾ | 380 | 450 | 1,900 | 45 | 130 | 240 | .196 |
| 3:30 p.m. | 4½ | | | | 45.5 | 135 | 250 | .228 |
| 4:00 p.m. | 5 | 362 | 430 | 1,745 | 45.5 | 140 | 255 | |

It will be seen from the foregoing that to obtain a gap of .175 inch about 3½ hours of heating was required. The time required to heat rods of other diameters can be determined from the following formula:

Heating time is proportional to $\frac{\text{Wt. of tie rods}}{\text{Volts} \times \text{current}}$ The current, of course, would depend upon the capacity of the alternating current voltage source which may be any suitable source. The voltage drop across the rods can be calculated from Ohm's Law where the resistance is the effective alternating current resistance of all four rods in series. The alternating current resistance of steel rods is calculated as follows:

(1) Resistivity of steel $\rho = 11.25 + 4.5$ (percent C − .02) microhm C.M. and for 45 carbon steel $\rho = 11.25 + 4.5(.45 − .02) = 13.185$ microhm C.M.

(2) The depth of current penetration is:

$$\delta = 1.98\sqrt{\frac{\rho}{\mu f}} \text{ (inches)}$$

Where
$\rho$ = Resistivity of material in microhm C.M.
$f$ = Frequency in cycles per second
$\mu$ = Flux density ÷ peak magnetizing force (oersteds)
$\mu$ = Approx. 800

Substituting value obtained from (1) in (2)

$$\delta = .198\sqrt{\frac{13.185}{800 \times 60}} = .0328 \text{ inch}$$

The resistance of a conductor is proportional to length/area, and converting microhm C.M. to microhm inches, multiply by $$\frac{2.54}{(2.54)^2}$$

or in other words, divide by 2.54 so that for $$1045 \text{ steel} = \frac{13.185}{2.54} = 5.19 \text{ microhm inches}$$

The alternating current resistance of a bar of 1045 steel 1 inch in diameter by 1 inch long would be calculated as follows:

Area = .0328 = .103 sq. in.

Length = 1 in.

$$R = \frac{1}{.103} = 50.4 \text{ microhms}$$

For any other size bar multiply by length and divide by diameter, or $$R = 50.4 \frac{\text{length}}{\text{dia.}} \text{ michroms.}$$

or $$R = .0000504 \frac{L}{D} \text{ ohms}$$

The resistance obtained in the above manner holds true for rods in open air separated from an inductive load. When the tie rods are surrounded by the frame of the press, however, a secondary current is induced in the frame. This induction of secondary current makes for an increase in the resistance in the rods and results in a higher voltage drop. The resistance of the rods varies directly as the length and inversely as the diameter of the rods and the heating time is proportional, as indicated above, to the weight of the rods divided by the voltage amperes passing through them. The induced current in the frame causes a localized heating of the plates surrounding the tie rods. Since there is a greater mass of steel in the press frame, the temperature rise of the frame is not sufficiently great to affect the results materially. A number of tests have shown me that the temperature of the press frame immediately surrounding the tie rods rises about one-third as fast as the temperature of the tie rods. In order to obtain the necessary 105° tempearture differential it will be necessary to heat the rods to an average temperature of 240° F., starting at a circumambient temperature of 80° F. At this time the press frame would have an average temperature of 135° F. at the portions immediately adjacent the rods.

In order not to overload the welding transformers the current should not exceed 2000 amperes for any length of time, and since the rating of the transformers used in this test was 40 volts, the product of voltage and amperes should not exceed 80,000. Welding transformers are rated for a one-hour duty cycle at full load. It was necessary, therefore, to provide additional air flow cooling for the transformers for heating times in excess of one hour. This was done by circulating air around the transformers by means of a fan.

The following table will illustrate the heating time for different diameters of tie rods:

| Dia. of Tie Rod | Approx. Length Arbitrarily Chosen to Get Approx. Figures | Effective Area (.030π D) | Ratio, L/A | I Proper Current Setting | E Across 4 Rods | EI Volt Amperes | Weight of 4 Rods | Time Required to Heat by Proportion | Approximate Power Consumption, KW. Hours |
|---|---|---|---|---|---|---|---|---|---|
| 2¼ | 80 | .212 | 377 | 1,985 | 38.8 | 76,900 | 356 | 5 Min. | 7 |
| 2¾ | 110 | .259 | 386 | 1,960 | 39.2 | 76,900 | 735 | 10 Min. | 14 |
| 3¼ | 150 | .306 | 490 | 1,740 | 44.2 | 76,900 | 1,400 | 20 Min. | 26 |
| 4 | 200 | .377 | 530 | 1,670 | 46.0 | 76,900 | 2,840 | 40 Min. | 51 |
| 5 | 220 | .471 | 467 | 1,780 | 43.1 | 76,900 | 4,850 | 70 Min. | 90 |
| 6 | 240 | .565 | 425 | 1,870 | 41.1 | 76,900 | 7,650 | 110 Min. | 141 |
| 8 | 280 | .755 | 371 | 2,000 | 38.4 | 76,900 | 15,800 | 225 Min. (3¾ Hr.) | 288 |
| 10 | 300 | .941 | 318 | 2,000 | 32.9 | 65,800 | 25,300 | 420 Min. (7 Hr.) | 460 |
| 12 | 350 | 1.13 | 310 | 2,000 | 32.0 | 64,000 | 42,800 | 735 Min. (12¼ Hr.) | 785 |

It will be noted that the current for a four-inch rod in the above table was 1670 amperes. In order to get the same heating with direct current, where the depth of penetration is complete as distinguished from alternating current, a current of 11,000 amperes would be required. It will be seen that the tie rods can be heated as a practical matter by the passage of electrical current only if alternating current is employed due to the fact that for circular tie rods there is a limited penetration in the depth of the current. With direct current the depth of penetration is always complete.

It will be seen that I have accomplished the objects of my invention. I have provided a novel system and method of heating tie rods uniformly, rapidly and expeditiously by means of passing a heavy alternating current of low voltage through the rods whereby hysteresis, eddy currents and the IR drop will heat the tie rods uniformly and rapidly, causing them to expand. By means of my method and system I have provided means for assembling and disassembling tie rod presses. My system does not interfere with the working or efficiency of the press.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A power press tie rod heating system, including in combination a press frame, a plurality of tie rods for holding the press frame in assembled position, means for insulating the tie rods from the press frame, means including nuts for holding tension upon the tie rods, means for insulating said nuts from the press frame, means for connecting the tie rods in series, and means for connecting the ends of the series-connected tie rods to a source of alternating current potential.

2. A power press tie rod heating system as in claim 1 in which said means for insulating the tie rods from the press frame comprises dielectric bushings.

3. A power press tie rod heating system as in claim 1 in which said means for insulating the tie rod nuts from the press frame comprises dielectric washers.

4. A power press tie rod heating system as in claim 1 in which said means for connecting the tie rods in series comprise bus bars and means for securing the bus bars to ends of adjacent tie rods.

5. A power press tie rod heating system, including in combination a press frame, four tie rods for holding the press frame in assembled position, nuts secured to the upper ends of the tie rods, nuts secured to the lower ends of the tie rods, means for insulating the nuts from the press frame, means for insulating the tie rods from the press frame, a bus bar for connecting the upper ends of a pair of adjacent tie rods to each other, a second bus bar parallel to the first bus bar for connecting the other pair of upper ends of tie rods to each other, a third bus bar disposed substantially at right angles to the first two bus bars for connecting the lower ends of a pair of adjacent tie rods to each other, and means for connecting the lower ends of the other two tie rods to a source of alternating current potential.

6. A method of heating tie rods of a power press, including the steps of insulating the tie rods from the press frame, connecting the insulated tie rods in series and then passing an alternating current through the series-connected tie rods.

7. A method of heating tie rods of a power press including the steps of insulating the tie rods from the press frame, connecting the insulated tie rods in series and then passing a low voltage, high density alternating current through the series-connected tie rods to heat and expand the same.

References Cited in the file of this patent

UNITED STATES PATENTS

| | | |
|---|---|---|
| 402,416 | Dewey | Apr. 30, 1889 |
| 1,119,150 | Halblieb | Dec. 1, 1914 |
| 1,149,518 | Holmes | Aug. 10, 1915 |
| 1,251,430 | Sherman | Dec. 25, 1917 |
| 1,321,530 | Macdonald | Nov. 11, 1919 |
| 1,839,850 | Hodgkinson | Jan. 5, 1932 |
| 1,863,073 | Smythe | June 14, 1932 |
| 1,960,166 | Rode et al. | May 22, 1934 |
| 2,089,030 | Kratky | Aug. 3, 1937 |
| 2,176,601 | Bates | Oct. 17, 1939 |
| 2,241,283 | Wackerle | May 6, 1941 |
| 2,448,277 | Reiner | Aug. 31, 1948 |
| 2,504,284 | Voigt | Apr. 18, 1950 |